C. L. Story,
Sawing Shingles,
Nº 21,453.  Patented Sept. 7, 1858.
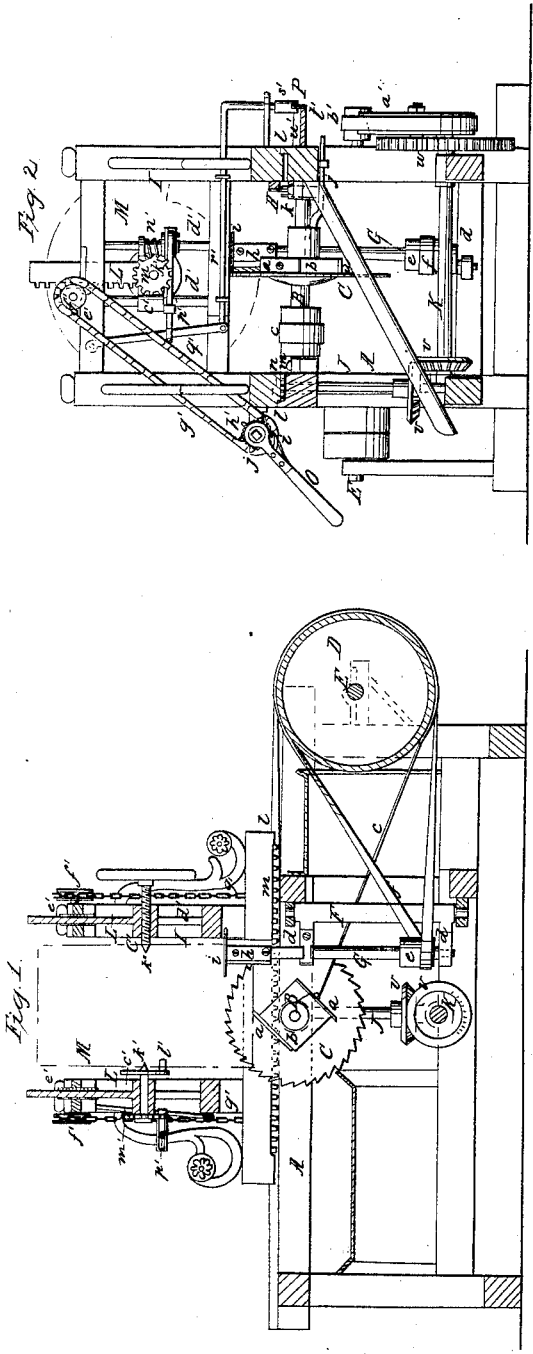
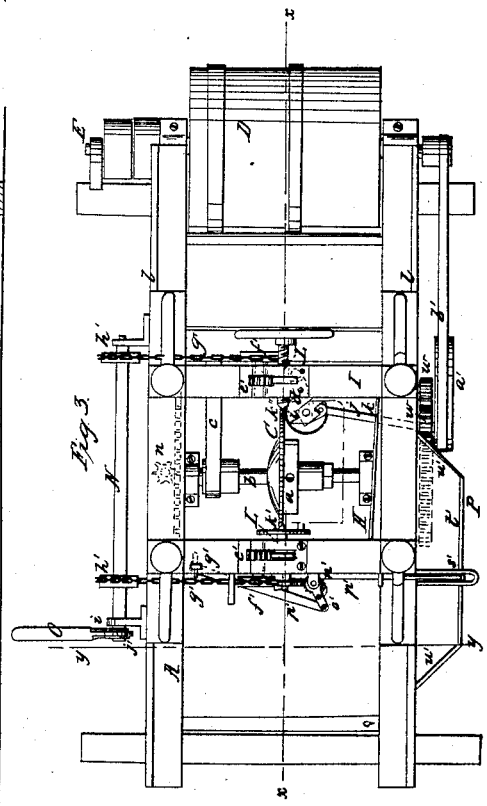

UNITED STATES PATENT OFFICE.

C. L. STORY, OF OWENSBORO, KENTUCKY.

METHOD OF MANUFACTURING SHINGLES FROM THE LOG.

Specification of Letters Patent No. 21,453, dated September 7, 1858.

*To all whom it may concern:*

Be it known that I, C. L. STORY, of Owensboro, in the county of Daviess and State of Kentucky, have invented a new and Improved Shingle-Sawing Machine; and I do hereby declare that the following is a full, clear, and exact description of the same, reference being had to the annexed drawings, making a part of this specification, in which—

Figure 1, is a side sectional elevation of a machine constructed according to my invention, $x$, $x$, Fig. 3, indicating the plane of section. Fig. 2, is a transverse vertical section of do. taken in the line $y$, $y$, Fig. 3. Fig. 3, is a plan or top view of do.

Similar letters of reference indicate corresponding parts in the several figures.

This invention relates to an improvement in that class of shingle machines, in which circular saws are employed for cutting the shingles from the bolt or log.

The invention consists in the employment or use of a circular saw and rotary cutters arranged, operated and used in connection with a traveling carriage as hereinafter fully shown and described, whereby shingles may be sawed directly from bolts cut from the rough log, the shingles being properly tapered and jointed while being sawed from the bolt so as to leave the machine in a finished state.

To enable those skilled in the art to fully understand and construct my invention I will proceed to describe it.

A, represents a rectangular frame which may be constructed in any proper manner to support the working parts.

B, is a saw mandrel which is placed in suitable bearings and transversely in the upper part of the frame A.

C, is a circular saw placed on said mandrel; and $a$, $a$, are two cutters which are attached to two opposite sides of a head $b$, adjoining the saw C. The mandrel B, is rotated by a belt $c$, from a drum D, which is placed at one end of the frame A, and on a driving shaft E.

F, is a shaft which is placed vertically in the frame A, and allowed to turn in its bearings. To the shaft F, two horizontal arms $d$, $d$, are attached, one at its upper and the other at its lower end, and in the outer ends of the arms $d$, $d$, a vertical shaft G, is fitted, said shaft being parallel with the shaft F. On the lower part of the shaft G, a pulley $e$, is placed, around which pulley a belt $f$, passes, said belt also passing around the drum D, see Fig. 1.

On the upper end of the shaft G, a square cutter head is placed, and two vertical cutters $h$, $h$, are attached to this head, the cutters $h$, being attached to two opposite sides of the head. A horizontal cutter $i$, is attached to the top of the head. To the upper arm $d$, of the shaft F, a link $j$, is connected by a pivot and the outer end of this link has an upright bar $k$, attached to it, said bar being notched in its upper surface to receive the lower edge of an oblique plate H, which is attached to a carriage I, at one side of its lower part, see Figs. 2 and 3.

The carriage I, may be constructed in any proper way. It works on ways or guides $l$, $l$, on the upper part of the frame A, and a rack $m$, is attached to one side of it at its bottom, a pinion $n$, gearing into said rack. The pinion $n$, is placed on the upper end of a vertical shaft J, which is placed in the frame A, said shaft being driven by gearing $v$, from a shaft K, which is rotated from the driving shaft E, by means of gearing $w$, a pulley $a'$, and belt $b'$, see Figs. 2 and 3.

In the carriage I, two vertical rack bars L, L, are placed, one at each end. The lower parts of these bars have cross heads $c'$, formed on them, and a vertical guide rod $d'$, passes through each end of the cross heads. A center post is fitted transversely in each cross head, and the bolt M, shown in red is fitted or centered between these points. The rack bars L, L, have pinions $e'$, $e'$, gearing into them, one in each, and the axes of these pinions have pulleys $f'$, on them, one on each, around which chains $g'$, pass, said chains passing around pulleys $h'$, on a shaft N, which is fitted in suitable bearings attached to the frame A, said shaft having a lever O, at one end, to which a pawl $l'$, is attached, the pawl catching into a ratchet $j'$, on the shaft N.

On the same disk or plate as the center point $k'$, a pivot $l'$, is formed and on the opposite end of the axis of said pivot a worm wheel $m'$, is placed into which wheel a screw $n'$, gears, said screw being fitted in suitable bearing attached to the cross head through which the axis of pivot $k'$, passes. The screw $n'$, gears into the worm wheel $m'$, and an arm $o'$, is attached to the axis of the screw $n'$, the outer end of the arm $o'$, having one end of a rod $p'$, pivoted to it, the opposite end of said rod being pivoted to a bar $q'$, the upper end of which is pivoted in the upper part of the carriage I. To the lower end of the bar $q'$, a rod $r'$, is attached, the outer end of said bar being bent downward and having a grooved or notched hub $s'$, attached to it, which fits over a guide ledge P, at one side of the framing A, said guide ledge being formed of a portion $t'$, which is parallel with the side of the frame A, and oblique end portions $u'$, $u'$, see Fig. 3.

The operation is as follows:—The bolt M, is placed between the centers $k'$, $k''$, the carriage I, placed at one end of the frame A, and motion given the shaft E. The bolt M, is previously depressed a suitable distance by actuating the shaft N, and the saw C, cuts radially into the bolt M, the carriage I, being fed along by the pinion $n$, and rack $m$, as the log is cut by the saw C, the cutters $h$, $h$, cut the side of the shingle which is being sawed in taper form, the cutters having a lateral movement given them by means of the oblique plate H, and the cutter $i$, cuts horizontally into the bolt detaching the upper edge of the shingle from the bolt and jointing the same while the cutters $a$, $a$, joint or cut smooth the lower edge, see Fig. 2. The bolt M, has the shingles cut from it in concentric rows, and consequently the bolt requires to be turned a trifle at the end of each cut, so that the bolt will be properly adjusted relatively with the saw in order to cut the shingles of the proper thickness. This is effected by the screw $n'$, and worm wheel $m'$, which are actuated at the end of each movement of the carriage I, by the oblique ends $u'$, of the guide ledge P. The butts and thin ends of the shingles are sawed from the bolt M, alternately from either end as the position of the plate H, is not changed. When one row of shingles is sawed from the bolt, the bolt is lowered the proper distance for a succeeding cut or row by actuating the shaft N.

I am aware that circular saws rotary cutters and traveling carriages have been used and arranged in many ways for sawing various articles, and I do not claim broadly the use of such parts irrespective of their arrangement as herein shown;

I claim therefore as new and desire to secure by Letters Patent,

1. The circular saw C, rotary and laterally moving cutters $h$, $h$, $i$, the rotary cutters $a$, $a$, and traveling carriage I, arranged and combined as shown, whereby the shingles are cut from the bolt, tapered and jointed at one operation.

2. I also claim the particular means herein described for rotating the bolt M, at each termination of the movement of carriage I, and thereby setting the bolt to the saw, to wit, the screw $n'$, worm wheel $m'$, actuated through the medium of the arm $o'$, rod $p'$, bar $q'$, rod $r'$, and guide ledge P.

C. L. STORY.

Witnesses:
S. J. HOWARD,
I. G. FORD.